Oct. 10, 1967     H. LUDWIG     3,345,664
METHOD OF MAKING A SHOE WITH INJECTION MOLDED BOTTOM
Filed Aug. 19, 1965

INVENTOR.
*Herbert Ludwig*
BY
*Roberts, Cushman & Grover*
ATTORNEYS

3,345,664
METHOD OF MAKING A SHOE WITH INJECTION MOLDED BOTTOM
Herbert Ludwig, Desmastr. 112, Usen, near Bremen, Germany
Filed Aug. 19, 1965, Ser. No. 480,863
6 Claims. (Cl. 12—142)

ABSTRACT OF THE DISCLOSURE

The method of manufacturing footwear comprising placing a lasted upper on the form to which it is lasted against the top of an open top mold having a movable sole plate and injecting bottom-forming material into the mold so as to form a dense edge strip peripherally of the bottom and then to form a sole having a dense tread surface and a cushion-like interior.

---

In order to obtain a shoe embodying softness for comfort and durability for wear, it is customary to form the sole with an inner cushion layer of porous sponge-like quality and an outer tread layer of dense wear-resistant quality. Such soles, however, are not wholly satisfactory because the relatively soft porous peripheral edge is prone to damage and rapid wear and a good bond cannot be obtained between the porous inner surface of the sole and the upper.

The objects of this invention are to provide a bottom embodying the desirable characteristics of softness and durability alluded to above without its disadvantages, to wit, to provide a bottom with a wear-resistant dense and smooth peripheral edge surface, an inner cushion layer which can be securely bonded to the upper especially at the peripheral edge where the stress is high and an outer tread surface which is resistant to wear. Further objects of the invention are to provide a novel method of forming a bottom structure by injection molding embodying the foregoing characteristics and an apparatus for practicing the method.

The footwear made according to the invention embodies an upper of suitable material and a multi-part bottom structure of an elastomer, characterized in that it comprises an outsole having a porous inner layer confronting the bottom of the shoe and forming a cushion layer, a non-porous dense outer layer providing a tread surface and a non-porous dense edge strip peripherally of the bottom and outsole which connects the outsole to the upper. The bottom, as thus formed by injection, may be applied to a string-lasted or flat-lasted upper and may include a midsole of felt or felt-like material contained within the edge strip between the inner surface of the outsole and the bottom of the upper, or a midsole comprised of the material of the edge strip and formed integral therewith.

In accordance with the method of making the shoe, a mold having a split ring and a movable sole plate is employed wherein the ring contains an inner peripheral groove corresponding substantially in depth to the thickness of the bottom to be formed. The sole plate is raised to a first position above the bottom of the groove, a non-foaming elastomer is injected into the cavity between the bottom of the upper and the sole plate to fill the groove and to form, when it sets, a dense, non-porous edge strip peripherally of the bottom of the upper, the sole plate is then lowered to a second position intermediate the first position and the lower edge of the groove whereupon an unfoamed, foamable elastomer is injected into the mold cavity provided by lowering of the sole plate, the sole plate is maintained in this second position until the surface of the elastomer next to the sole plate solidifies, and then the sole plate is again lowered to a third position slightly below the lower edge of the groove and allowed to remain in this position until foaming takes place and the foamed elastomer sets. Optionally, the second step may be omitted and pre-foamed elastomer injected to form an outsole contained within and attached to the upper by the edge strip but with a porous sponge-like tread surface.

The invention will now be described in greater detail with reference to the accompanying drawings wherein.

Figures 1, 2, 3, 4, 5:
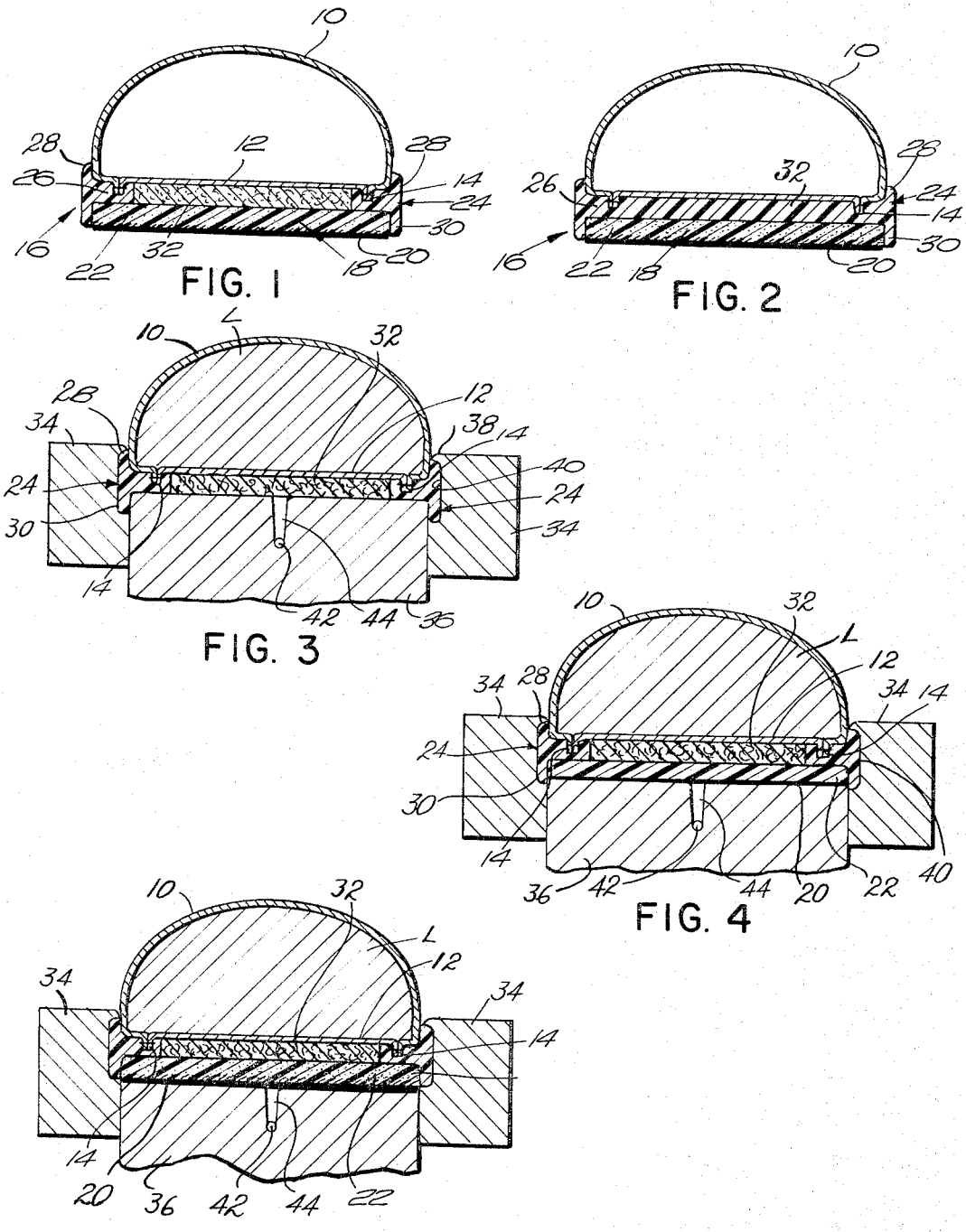
FIG. 1 is a vertical section transversely of a shoe made according to this invention illustrating a midsole of felt or the like material.
FIG. 2 is a vertical section transversely of a shoe made according to this invention with a midsole formed of the same material as the edge strip and integral therewith.
FIG. 3 is a vertical section through a shoe made according to this invention, showing a mold comprised of a sole plate and split ring, with the sole plate raised to a position to form the edge strip by injection.
FIG. 4 is a corresponding view showing the sole plate lowered to a position for injection of the outsole and formation of a dense tread surface prior to foaming.
FIG. 5 is a corresponding view showing the sole plate lowered to a position slightly below the lower edge of the edge-forming groove for foaming and setting of the outsole.

Referring to the drawings (FIG. 1), there is shown a vertical section through a shoe made according to this invention which comprises an upper 10 of suitable flexible material, an insole 12 joined to the upper material by a seam 14 and a multipart bottom structure 16 partly or wholly of elastomer. The bottom structure 16 comprises an outsole 18 having a bottom layer 20 of dense wear-resistant material providing a tread surface and a cushion layer 22 of porous sponge-like material inwardly of the bottom layer and confronting the bottom of the upper which provides a cushion for foot comfort. The outsole 18 is attached to the upper 10 by an edge strip 24 also comprised of a dense material having a horizontal portion 26 which extends between the bottom of the upper and the top of the outsole all of the way around the bottom and in which the seam 14 joining the upper and insole is embedded, an upwardly projecting portion 28 which engages the upper material at the outer side of the shoulder and a downwardly projecting portion 30 which engages the peripheral edge of the outsole. A midsole 32 of felt or similar cushion-like material may be inserted between the outsole and insole within the inner side of the edge strip 24. Optionally, this midsole may be omitted and the horizontal portion 26 of the edge strip 24 made coextensive with the bottom of the upper as shown in FIG. 2.

The edge strip 24 is made of a dense elastomer so as to resist wear and damage and to protect the peripheral edge of the outsole which, as previously mentioned, is comprised of a porous sponge-like material. The edge strip not only protects the peripheral edge of the outsole but also enables attaining a good bond between the outsole and the upper especially at the shoulder where the stresses are high. Finally, since the edge strip is dense and smooth it provides a bottom with an attractive finish.

In each form of manufacture the outsole is connected to the upper by the edge strip; however, if desired, adhesive may be applied to the lower surface of the bottom of the shoe and/or to the surfaces of the midsole when the latter is employed to enhance the bond.

The term "elastomer" as herein used is intended to embrace any and all plastics or plastic-like materials embodying characteristics of elasticity and capable of being rendered plastic for a sufficient length of time to be injected into a mold to form the bottom part of a shoe and to be then caused to set, cure or otherwise become dimensionally stable.

The shoe, as shown in FIG. 3, is made by a process of injection molding in which a split mold ring 34 and sole plate 36 of conventional kind are employed. The mold ring 34 is comprised of two halves, has a lip 38 around the top for engagement with the shoulder of a shoe placed against the top of the mold and, in accordance with this invention, a groove 40 peripherally of its inner surface to which plastic material may be supplied through an injection passage (not shown) in the ring, for example at the mating faces of the two halves of the mold at the heel end. The sole plate contains a passage 42 (FIG. 3) extending lengthwise thereto and one or more passages 44 extending from the passage 42 upwardly through the surface of the sole plate into the mold cavity through which plastic material may be supplied to the mold cavity.

In accordance with the method of use, and referring to FIGS. 3, 4 and 5, a midsole of felt or equivalent material 32 is placed on the upper surface of the sole plate 36, an upper 10 with an insole 12 attached thereto mounted on a last L is placed on the mold ring 34 with the bottom seated against the supporting lip 38 and the sole plate 36 is moved upwardly to a first position such as shown in FIG. 3, in which position the midsole engages the bottom of the shoe. Plastic is now injected to fill the groove 40 and the marginal portion of the mold cavity between the groove and the peripheral edge of the midsole, thus forming peripherally of the bottom an edge strip 24 which comprises an inner part 26 joined to the lower side of the shoulder, an upwardly projecting flange-like part 28 joined to the outer side of the shoulder and a downwardly projecting flange-like portion 30 forming a downwardly open cavity at the bottom of the shoe. After the edge-forming material has been injected and allowed to harden or set, the sole plate 36 is lowered to a second position as shown in FIG. 4 and plastic is injected into the cavity between the sole plate and the midsole which contains a foaming agent. A foaming agent is selected which will remain quiescent for a predetermined period of time before it becomes effective to enable an initial setting or hardening of the injected plastic at the surface next to the sole plate. During this period of quiescence the sole plate is maintained in the position shown in FIG. 4 until the surface of the plastic next to the sole plate solidifies and provides a dense non-porous wear-resistant surface. The setting or solidifying of the plastic next to the sole plate is brought about by the difference in temperature between the sole plate which is relatively cool and the plastic which is relatively hot. The sole plate is now lowered again to a third position such as shown in FIG. 5 which is preferably slightly below the lower edge of the groove in the ring and is held in this position until the foaming agent becomes effective to expand and to form the porous cushion-like inner layer 22 inwardly of the tread surface 20. The cushion layer is contained entirely within the lower projecting flange 30 of the edge strip and becomes securely attached to the upper through the intermediary of the edge strip.

Alternatively, the felt midsole may be omitted and the entire mold cavity between the sole plate and the bottom of the shoe filled with plastic with the sole plate elevated to the position shown in FIG. 3, so that the edge strip and midsole are integral. An outsole is now formed in the same manner as related above to provide a dense wear-resistant tread surface 20 and a cushion layer 22 inwardly thereof and confined between the inner surface of the edge strip 24 and the lower surface of the midsole.

Optionally the outsole may be formed by lowering the sole plate from the first position to the third position, that is, omitting the second position and injecting into the mold cavity plastic which has already been foamed in the injection unit. As thus constructed, the shoe will have the advantage that the outsole will be securely bonded to the bottom by the edge strip but the bottom surface will be porous and soft as compared to the preferred bottom which is dense and wear resistant.

It is desirable when making the shoe of the kind illustrated in FIG. 1, wherein a felt midsole is employed, to use a midsole of such dimensions that the inner portion 26 of the edge strip will extend inwardly beyond the seam and thus embed the seam 14. If the uppers are flat-lasted or string-lasted it is correspondingly desirable to extend the portions 26 inwardly far enough to cover the overlap of the lasting margin and inner sole or the string-lasting as the case may be.

In whatever form the shoe takes, the advantages obtained by the foregoing construction reside in insuring a good bond between a sole which is comprised principally of a soft, porous, sponge-like material and is therefore difficult to attach to an upper, a sole of this kind which will not become deformed or damaged by reason of the protective peripheral edge strip and a bottom embodying a dense wear-resistant tread surface.

It should be understood that the present disclosure is for the purpose of illustration only and that this invention includes all modifications and equivalents which fall within the scope of the appended claims.

I claim:

1. The method of making footwear comprising forming an edge strip of dense material by injection molding peripherally of the bottom of a lasted upper, injecting an unfoamed liquid plastic material containing a foaming agent within the edge strip, to form a bottom coextensive with the bottom of the upper within said edge strip, causing the lower surface of the injected liquid plastic to solidify prior to the activation of the foaming agent to form a dense tread surface and then allowing the foaming agent to inflate the material inwardly of the tread surface to form an inner porous cushion confronting the bottom of the upper.

2. The method of making footwear comprising providing a mold having a ring and a movable sole plate, said ring containing an inner peripheral groove corresponding substantially in depth to the thickness of the sole to be attached, placing a lasted upper in the opening of said mold, raising the sole plate to a position above the bottom of said groove, injecting a nonfoaming dense liquid plastic material into the mold cavity between the bottom of the sole plate and the bottom of the upper to fill the groove and to form an edge strip peripherally of the bottom, lowering the sole plate to a position intermediate said first position and the lower edge of the groove, injecting a foamable material into the cavity provided by lowering of the sole plate, allowing the lower surface of the material next to the sole plate to solidify, and then lowering the sole plate to a position slightly below the lower edge of the groove in the ring and retaining it in said position until said material foams and sets.

3. The method of making footwear comprising providing a multi-part mold having a ring and a movable sole plate, said ring containing an inner peripheral groove, the vertical depth of which corresponds substantially to the entire thickness of the bottom to be attached, placing a lasted upper in the opening of said mold, raising the sole plate to a first position close to the bottom of the lasted upper, injecting bottom-forming composition of a nonfoamable liquid plastic material through the ring into the groove to form an edge strip peripherally of the bottom, lowering the sole plate to a position intermediate the first position and the bottom of the groove in the ring, injecting bottom-forming composition containing a quiescent foaming agent into the cavity formed by lowering of the sole plate to said second position, allowing the sole plate to remain in said second position until the surface of the bottom-forming composition next to the sole plate solidifies, lowering the sole plate to a position slightly below the lower edge of the groove and holding the sole plate in this last position until the foaming agent effects foaming and the material sets.

4. A method according to claim 2, comprising placing a yieldable midsole on the sole plate of such size as to fit within the area at the bottom surrounded by the seam connecting the upper and insole and to fill the space between the bottom and the sole plate.

5. A method according to claim 2, comprising filling the entire space between the bottom and the sole plate, when the latter is raised to the position to form the edge strip, with bottom-forming composition corresponding to that injected to form the edge strip.

6. The method of making footwear comprising providing a multi-part mold having a ring and movable sole plate, said ring containing an inner peripheral groove, the vertical depth of which corresponds substantially to the entire thickness of the bottom to be formed, raising the sole plate to a position above the bottom of the groove, filling the entire mold cavity between the sole plate and the bottom of the shoe with a non-foaming dense liquid plastic material, lowering the sole plate to a position slightly below the bottom of the edge of the groove, injecting a prefoamed plastic material to fill the cavity left by lowering of the sole plate, and maintaining the sole plate in this latter position until the injected material becomes structurally stable.

References Cited

UNITED STATES PATENTS

| | | | |
|---|---|---|---|
| 2,129,106 | 9/1938 | Szerenji et al. | 36—14 |
| 2,694,871 | 11/1954 | Rollman | 36—14 |

FOREIGN PATENTS

| | | |
|---|---|---|
| 706,304 | 3/1931 | France. |
| 807,199 | 10/1936 | France. |
| 1,392,836 | 2/1965 | France. |
| 762,351 | 11/1956 | Great Britain. |
| 457,674 | 5/1950 | Italy. |

JORDAN FRANKLIN, *Primary Examiner.*

A. R. GUEST, *Assistant Examiner.*